United States Patent [19]
Toliver et al.

[11] Patent Number: 6,068,211
[45] Date of Patent: May 30, 2000

[54] METHOD OF EARTH ORBIT SPACE TRANSPORTATION AND RETURN

[76] Inventors: David M. Toliver, 13740 Shoup Ave., Hawthorne, Calif. 90250; Richard T. Cervisi, 10 Shadwell, Irvine, Calif. 92720; Armand R. Vanore, 27615 Eastvale Rd., Palos Verdes Peninsula, Calif. 90274

[21] Appl. No.: 08/736,874

[22] Filed: Oct. 25, 1996

Related U.S. Application Data

[63] Continuation of application No. 08/361,170, Dec. 21, 1994, abandoned, which is a continuation of application No. 08/122,632, Sep. 17, 1993, abandoned.

[51] Int. Cl.$^7$ .................................................. B64G 1/10
[52] U.S. Cl. ............................................ 244/2; 244/158 R
[58] Field of Search .................................. 246/2, 158 R, 246/63, 172, 3.1, 3.15

[56] References Cited

U.S. PATENT DOCUMENTS

| | | | |
|---|---|---|---|
| 4,802,639 | 2/1989 | Hardy et al. | 244/2 |
| 4,834,324 | 5/1989 | Criswell | 244/2 |
| 4,901,949 | 2/1990 | Elias | 244/63 |
| 5,090,642 | 2/1992 | Salk et al. | 244/2 |
| 5,295,642 | 3/1994 | Palmer | 244/63 |

FOREIGN PATENT DOCUMENTS

| | | | |
|---|---|---|---|
| 3740645 | 6/1989 | Germany | 244/2 |

OTHER PUBLICATIONS

Astronautics, Jan. 1963 pp. 51–56.
Peebles, "Air–launched Shuttle Concepts" Journal of the British Interplanetary Soc. Apr. 1983 vol. 36 No. 4 pp. 153–155.

*Primary Examiner*—Galen L. Barefoot
*Attorney, Agent, or Firm*—Harry B. Field; Lawrence N. Ginsberg

[57] ABSTRACT

The present invention is a method of earth orbit space transportation and return utilizing a reusable flyback satellite. A reusable flyback satellite is positioned to a desired release point which provides the capability of the satellite to achieve a desired orbit. The satellite is deployed from that release point. It is then injected into orbit. On-orbit function and services to a payload of the satellite are provided. The satellite is de-orbited, re-entered and landed with airplane-like functionality and utility.

4 Claims, 8 Drawing Sheets

METHOD OF EARTH ORBIT SPACE TRANSPORTATION AND RETURN

This application is a continuation of application Ser. No. 08/361,170 filed on Dec. 21, 1994, now abandoned which is a continuation of Ser. No. 122,632 filed on Sep. 17, 1993, now abandoned.

BACKGROUND OF THE INVENTION

The present invention relates to space transportation and more particularly to a method for providing orbital space transportation of a satellite and return of the satellite.

Several deficiencies stand out within the international infrastructure for space transportation and utilization. No capability currently exists for placing small payloads in orbit in a timely, flexible and cost effective manner, supporting the payloads while on-orbit, and returning them and their data to earth with airplane-like utility. These deficiencies become more apparent as time passes. Small payloads become more capable due to quantum improvements in electronic and sensor technologies. Maturing booster and return vehicle technologies in a variety of areas make cost effective solutions practical.

Existing means for returning payloads from space include the American Space Shuttle, the Russian Soyuz and Buran vehicles, and Chinese return capsules. Both Shuttle and Soyuz are large manned vehicles with high costs per flight due to their size and the rigorous safety precautions associated with manned space flight. These vehicles also fly infrequently, and as a result, the payload writing lists are long and many payloads are never flown. Buran is the size of the Space Shuttle and it is intended for manned flight, but it has only flown once in an unmanned mode. The Chinese return capsules are based on 1960's Russian technology. They impose high acceleration loads on their payloads during entry, they are uncontrollable, and their landing point is unpredictable.

Existing means for placing payloads in orbit include a variety of international launch vehicles with payload capabilities ranging from hundreds to hundreds of thousands of pounds to low earth orbit. With one exception, all of these vehicles are ground launched, which does not allow the independent stipulation on inclination and longitude of the ascending node. As a result, a constellation of 15 or 16 satellites are required to observe a region of the earth's surface during every low earth orbit period. Launch and satellite costs preclude the establishment of such orbital configurations and the timely observation of any particular region on the earth. Launch windows for rendezvous and docking and orbiting platforms are also severely constrained for ground launched boosters. And, the lowest achievable inclination without severe payload penalties is limited by ground launching to greater than or equal to the latitude of the launch site.

The one exception is known as Pegasus. Pegasus is disclosed in U.S. Pat. No. 4,901,949, issued to A. L. Elias, entitled "Rocket-Powered, Air-Deployed, Lift-Assisted Booster Vehicle for Orbital, Supraorbital and Suborbital Flight". It is a multistage air-launched vehicle that can place hundreds of pounds into low earth orbit. Air-launching allows independent selection of launch point and launch azimuth, which in turn provides for the independent specification of orbital inclination and longitude of the ascending node. Such orbits are called tailored orbits, and they allow repeated overflight of regions on the earth's surface. Overflights on as many as four successive orbits are possible. Instead of requiring 15 or 16 satellites to observe a region of the earth's surface during every low earth orbit period, only 4 satellites are required. However, Pegasus is purely a launch vehicle and, as such, is neither capable of supporting a payload while on-orbit, nor is it capable of returning a payload to earth.

Due to high launch costs and inadequate means for returning payloads from space, satellites and their payloads are designed for high reliability, long life and robust communications capabilities. Satellite and payload development and production times and costs are high due to this situation. Down linking data through elaborate satellite and ground communications networks often does not allow the data to reach users in a timely manner. And many potential satellite payloads have never been developed due to a lack of a timely, low deceleration, and cost effective return capability.

These deficiencies limit our utilization of space, and to overcome them, the present invention proposes an apparatus which provides a return from orbit capability with airplane-like utility, which supports payloads while on-orbit, and which is air-launched to allow timely achievement of orbits with specified inclination and longitude of the ascending node. These capabilities are made possible by the first time integration of maturing technologies in a variety of areas. These include the Pegasus air-launched booster; low to moderate temperature composite structures; durable thermal protection systems; reliable, light weight and low power avionics; high energy density batteries and deployable and retractable solar arrays; and low weight and high efficiency storable propellant rocket engines.

SUMMARY OF THE INVENTION

The present invention is a method of earth orbit space transportation and return utilizing a reusable flyback satellite. A reusable flyback satellite is positioned to a desired release point which provides the capability of the satellite to achieve a desired orbit. The satellite is deployed from that release point. It is then injected into orbit. On-orbit function and services to a payload of the satellite are provided. The satellite is de-orbited, re-entered and landed with airplane-like functionality and utility.

The step of positioning the reusable flyback satellite to a desired release point preferably includes the steps of a) positioning the reusable flyback satellite to a desired first position via a carrier aircraft, wherein the reusable flyback satellite, having accelerating and positioning means attached thereto, is detached from the carrier aircraft; and, b) accelerating the reusable flyback satellite to the desired release point via the accelerating and positioning means whereupon the reusable flyback satellite is released from the accelerating and positioning means.

The terms "REFLY" or "reusable flyback" vehicle as used herein refers to a vehicle which is capable of completing insertion into a desired orbit with a payload, supporting the payload on orbit, de-orbiting, re-entering and landing on a runway in an aircraft fashion.

The accelerating and positioning means preferably comprises a rocket booster vehicle, preferably of the type known as "Pegasus".

Other objects, advantages and novel features of the present invention will become apparent from the following Detailed Description of the invention when considered in conjunction with the accompanying drawings.

BRIEF DESCRIPTION OF THE DRAWINGS

FIG. 1c is a side view of the apparatus of FIG. 1a.

FIG. 4b is a rear view of the reusable flyback vehicle of FIG. 4a.

FIG. 4c is a side view of the reusable flyback vehicle of FIG. 4a.

The same elements or parts throughout the figures of the drawings are designated by the same reference characters.

DETAILED DESCRIPTION OF THE PREFERRED EMBODIMENT

Figure 1A:
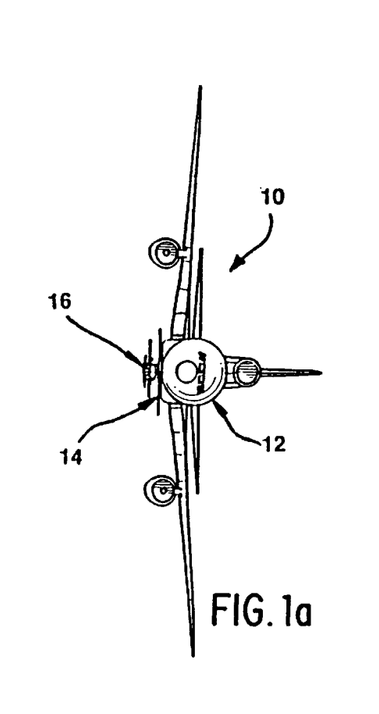
FIG. 1a is a front end view of the reusable flyback vehicle and booster vehicle mated to a carrier aircraft, illustrating the reusable flyback satellite system of the present invention.
Figure 1B:
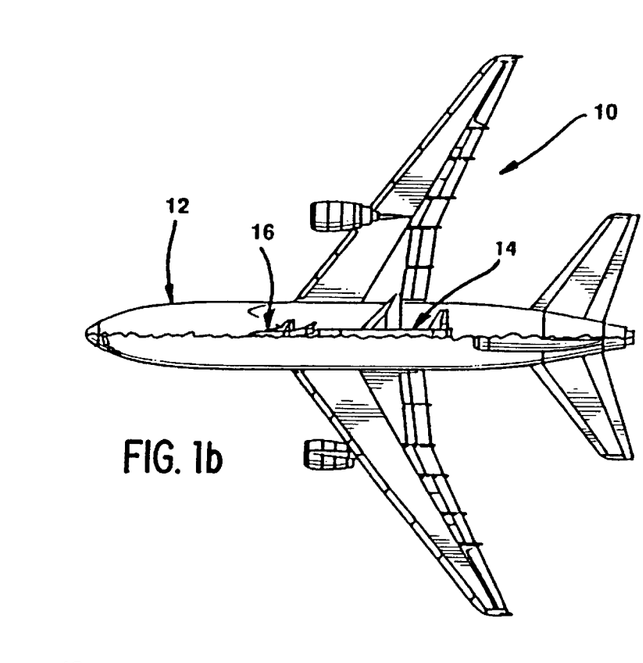
FIG. 1b is a split planform view of the apparatus of FIG. 1a with half of the figure showing a view from below and the other half showing a view from above.
Figure 1C:
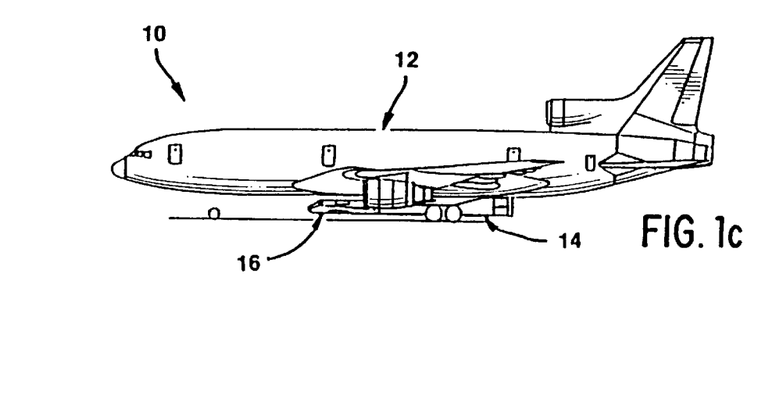

A preferred embodiment of the system of the present invention is depicted in FIGS. 1a–1c, designated generally as 10. The Reusable Flyback Satellite (REFLY) System consists of, preferably, a L-1011 carrier aircraft 12 (or other suitable aircraft), the first two stages of a Pegasus booster 14 and a REFLY vehicle 16. As used herein, the term "Pegasus" may refer to the standard Pegasus, Pegasus XL, Pegasus XL with strap-ons, or any derivative of Pegasus. The REFLY vehicle 16 is attached to the Pegasus booster 14 which is attached to the underside of the carrier aircraft 12.

Figure 2A:
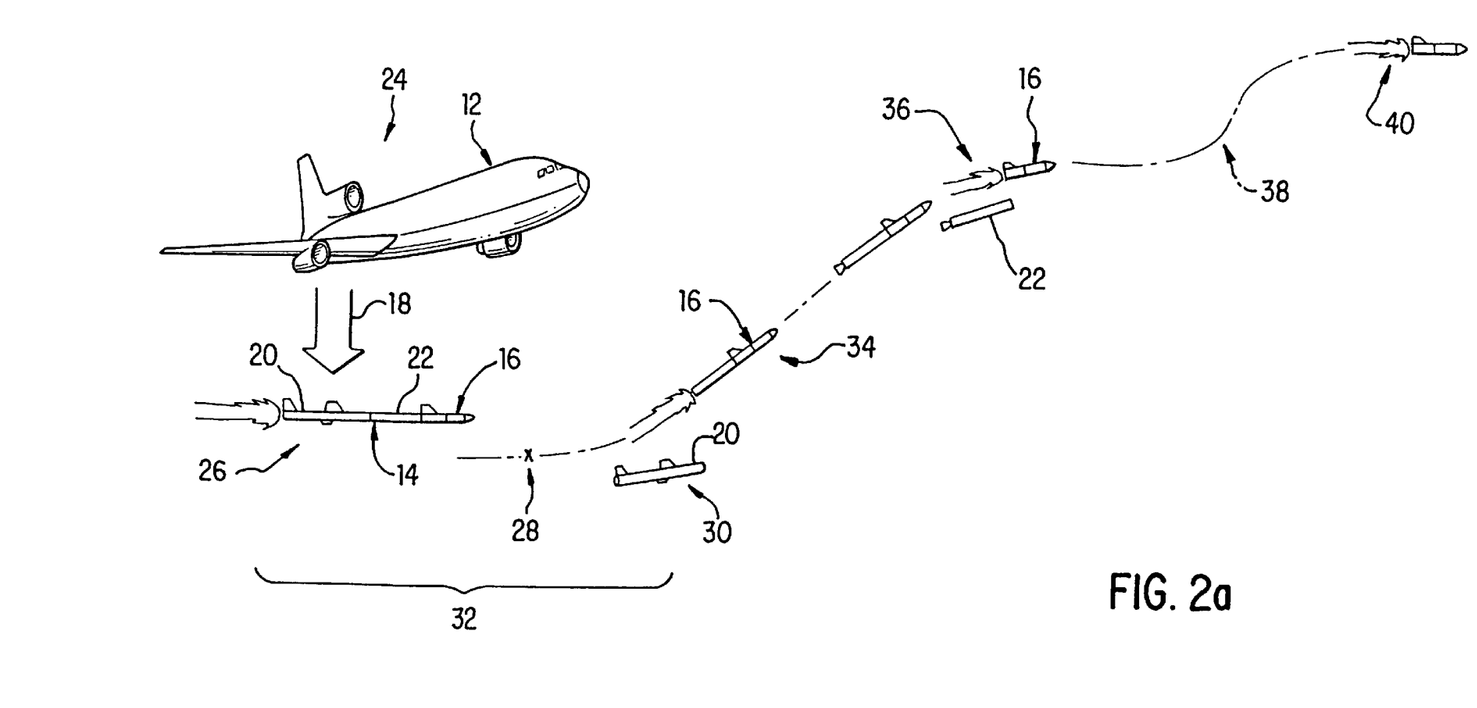
FIG. 2a is a schematic diagram illustrating the launch method of the reusable flyback vehicle of the present invention.

System operation during ascent to orbit is depicted in FIG. 2a. The L-1011 Carrier Aircraft 12 flies to the desired launch point 24. Upon reaching the launch point 24 and conducting appropriate checkout tests and other functions, at t=zero seconds, the launch vehicle 14, 16 is air-launched at subsonic velocities (e.g. Mach number of approximately 0.80) at an altitude of approximately 40,000 feet in a substantially horizontal attitude. After a safe separation from interior aircraft 12, there is a free fall phase (designated by arrow 18) while the launch vehicle 14, 16 establishes its own flight attitude and then at point 26 (e.g., t=5 seconds) the first stage motor 20 ignites. Ignition of the first stage 20 accelerates the launch vehicle 14, 16 through a high acceleration pull-up maneuver (approximately 2.5 G).

At point 28 (e.g. t=30 seconds, V=mach 3.0, altitude=78,000 feet) the launch vehicle 14, 16 aerodynamic control surfaces are placed in a configuration causing launch vehicle 14, 16 to pitch down, thereby decreasing its ascent flight path. Point 28 is determined to be the point where the parameter $\rho V^2$ has reached its maximum value and corresponds to the point of peak aerodynamic load on launch vehicle 14, 16 (e.g. approximately 1,000 psf).

At point 30 (e.g. t=78 seconds, V=7,950 fps, altitude= 158,000 feet), first stage burn out and jettison occur. Points 26–30 represent a first phase 32 of the flight of launch vehicle 14, 16, during which the trajectory is exclusively aerodynamically controlled.

After first stage burnout (point 30) the second stage ignition occurs at point 34 (e.g. t=94 seconds, altitude=207,000 feet) after an optimal coast period.

Third stage ignition occurs after second stage burnout at point 36 (e.g., t=161 seconds, altitude=400,000 feet, velocity=14,145 fps) followed by third stage burnout at point 38 (e.g., t=558 seconds, altitude=713,000 feet, velocity=24,896 fps). After coasting to apogee of the resultant elliptical orbit, the REFLY vehicle 16 fires its engines to circularize the orbit at point 40 (e.g., t=53 minutes, altitude= 200 nmi, 12,000 nmi down range).

Figure 3:
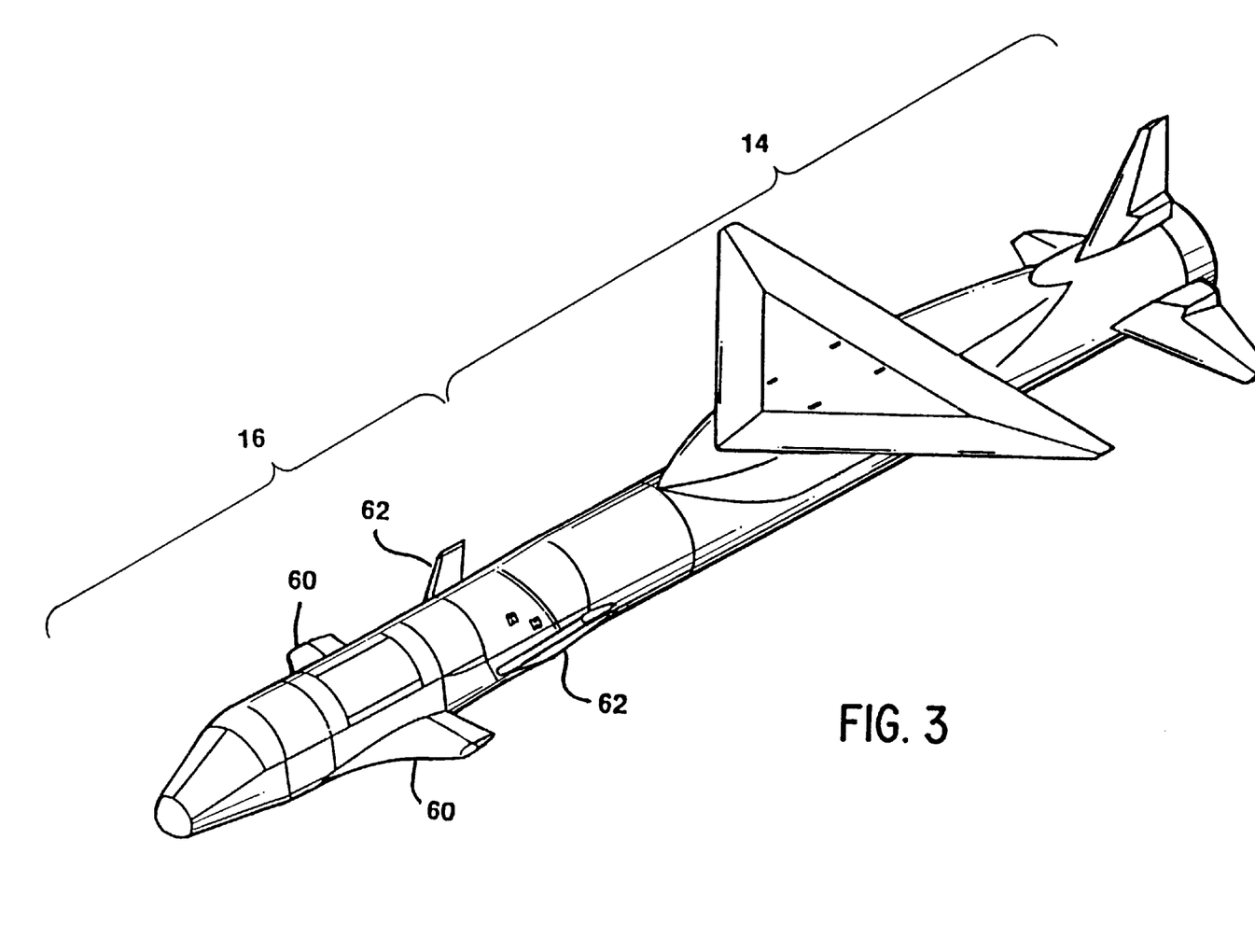
FIG. 3 is a front perspective illustration of the launch vehicle of the present invention including the reusable flyback vehicle and a Pegasus booster vehicle.

Heretofore, the Pegasus booster 14 has contained a third and sometimes a fourth stage which accelerates a satellite to orbit. The satellite has consisted of a bus and a payload and is not part of the launch vehicle. In the present invention, as depicted in FIG. 3, and will be described in more detail below, the refly vehicle 16 is the third stage of the launch vehicle 14, 16, providing approximately 41% of the mission velocity requirement. It performs the functions of the satellite bus, and it provides hundreds of pounds of more useful payload capability.

Figure 2B:
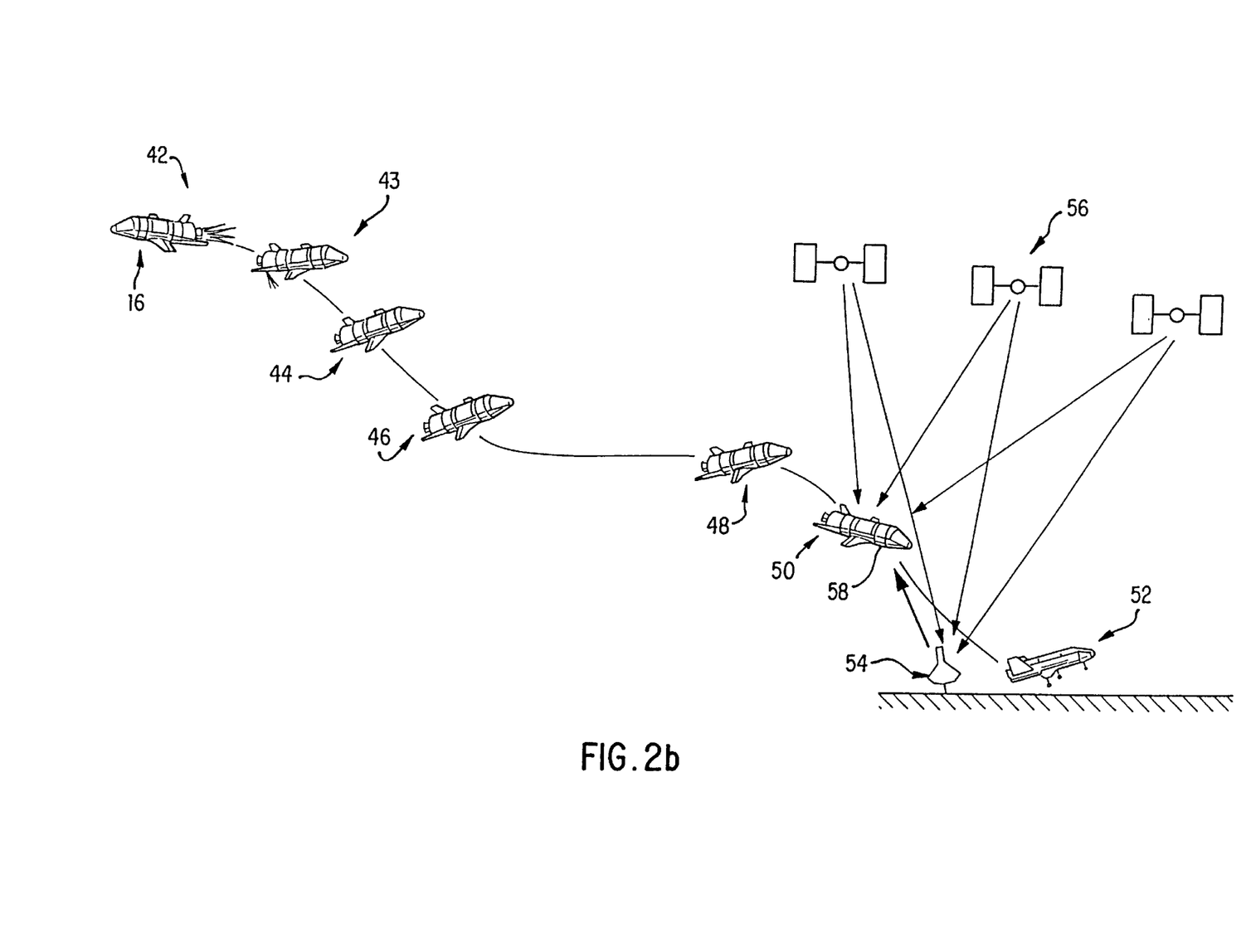
FIG. 2b is a schematic diagram illustrating the re-entry and landing of the reusable flyback vehicle of the present invention.

REFLY vehicle operation during entry, approach and landing is depicted in FIG. 2b. After the de-orbit burn 42 (t=0 secs), the vehicle 16 is oriented for atmospheric re-entry (point 43). Endoatmospheric flight beginning at point 44 (e.g. t=27 minutes, altitude 400,000 feet, angle of attack=40 degrees) is controlled to limit the surface temperature, heat load and accelerations experienced by the vehicle and payload. This is accomplished using combined aerodynamic and attitude control thrusters. The vehicle controls its downrange and crossrange to target to the runway. At point 46 (e.g., t=32 minutes, altitude=267,000 feet) the REFLY vehicle pulls out using bank to control heat rate acceleration and crossrange.

Terminal area energy management maneuvers begin at point 48 (e.g. Mach number approximately 1.5, altitude approximately 90,000 feet) which aligns the vehicle with the runway. Intercept of the initial glide slope occurs at point So (e.g., t=51 minutes, Mach approximately 1.0). Finally, touchdown occurs at point 52 (e.g. t=53 minutes, velocity less than 154 knots, 8 fps maximum sink rate).

These operations are similar to the Space Shuttle. However, the Space Shuttle is a manned vehicle which is landed by a pilot. The REFLY vehicle 16 is preferably an unmanned vehicle which is automatically landed using a navigation system consisting of the global positioning system (GPS) 56 in a differential operation mode and a radar altimeter 58. (The Russian Buran has been landed automatically, but it has used a more complex landing system.) The REFLY approach of the present invention allows the vehicle to be landed on relatively unprepared runways anywhere in the world. A GPS transceiver 54 is located at a surveyed runway site which determines position correction information for transmission to the REFLY vehicle 16. The REFLY vehicle 16 combines its own GPS determined position, ground GPS correction information, and radar altimeter information to achieve the necessary landing accuracy.

Referring again to FIG. 3, two important features for REFLY vehicle 16 are illustrated. The wings 60 of the REFLY vehicle 16 provide lift forces and control moments to support and stabilize the launch vehicle during the high acceleration pull-up maneuver. In addition, both the wings 60 and the tails 62 of the REFLY vehicle 16 provide control moments at burn out of the first stage to allow a more efficient ascent trajectory than is available from the Pegasus 14 alone. Higher efficiency results in a more useful payload being placed in orbit. Finally, the twin canted tails 62 of the REFLY vehicle 16 are designed to allow attachment of the launch vehicle 14, 16 to the underside of the aircraft 12.

Figure 4A:
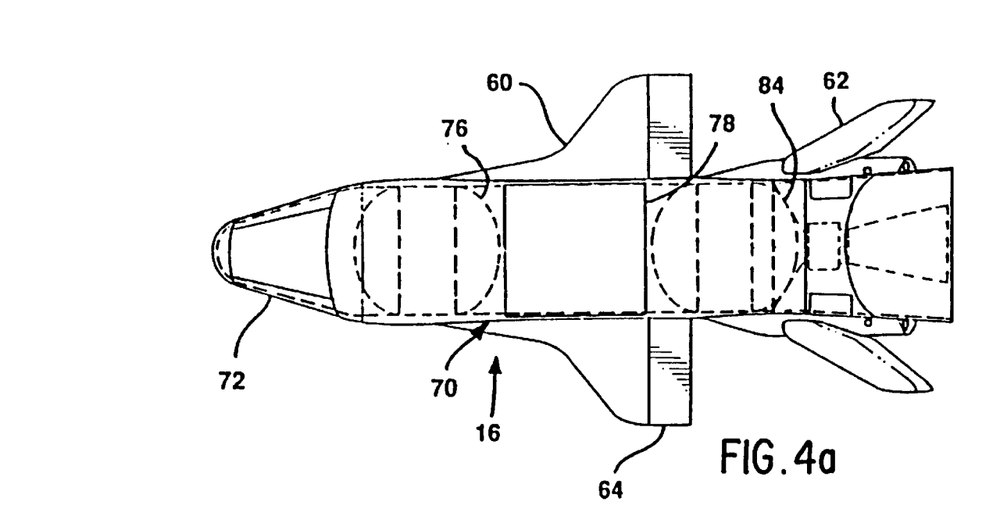
FIG. 4a is a top view of the reusable flyback vehicle of the present invention, with phantom lines showing salient internal components.
Figure 4B:
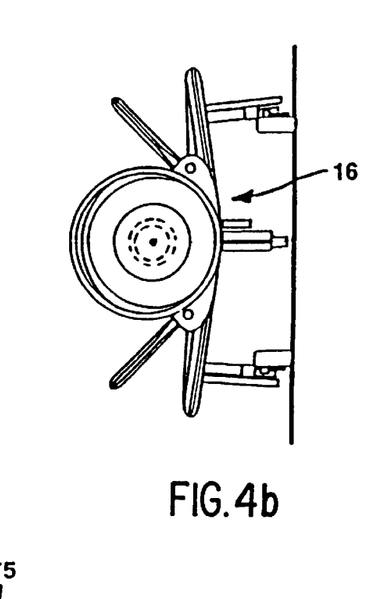
Figure 4C:
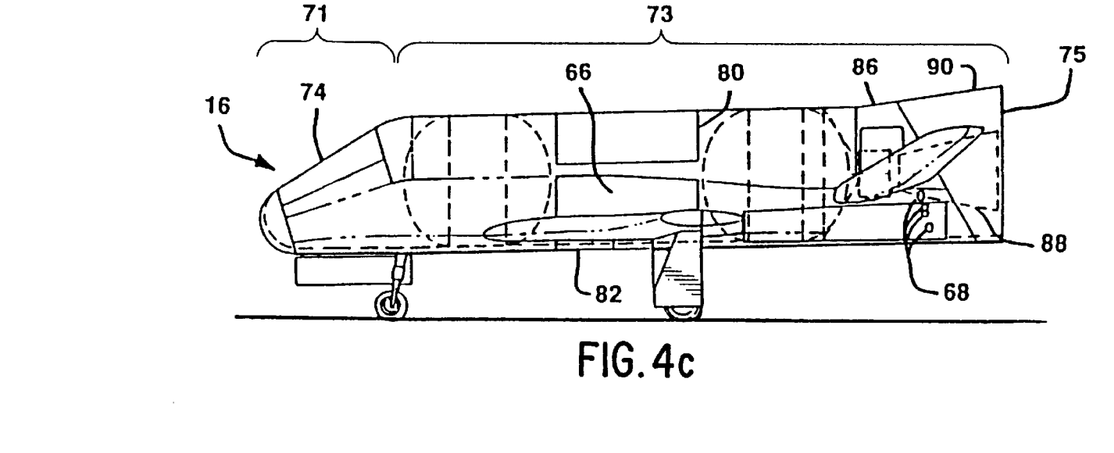

Referring now to FIGS. 4a–c, a more detailed illustration of the REFLY vehicle 16 is shown. For flight within the atmosphere, the wings 60 contain hinged control surfaces 64 (called "flaperons") to provide roll control and to enhance aerodynamic lift. The wing span is preferably limited to 10 feet to allow air transport of the REFLY vehicle 16 by readily available aircraft, such as a Lockheed C-130 transport. The all moving canted tails 62 (called "ruddervators") provide pitch and yaw control, and are designed to statically stabilize the vehicle during endoatmospheric flight regimes. The canted tail design 62 allows the REFLY vehicle 16 to be mated on the underside of the carrier aircraft unobtrusively. A speed brake 66 along the side of the vehicle 16 is used for energy management during approach and landing. An attitude control system consisting of attitude control thrusters 68 and reaction wheels (not shown) is used for controlling the vehicle during exoatmospheric flight.

The vehicle fuselage 70 provides an aerodynamic shape required for controllable re-entry. This is achieved with a skewed conic forward section 71 and a cylindrical mid and aft fuselage 73 with a blunt base 75. The skewed conic forward section 71 is achieved by rotating the axis of symmetry downward relative to the central axis of the cylindrical mid and aft fuselage.

The vehicle fuselage 70 contains a forward equipment and avionics bay 72 with access through a removable cover 74; a forward propellant tank 76; a payload compartment 78 with access through payload doors 80; a mid equipment, landing gear and avionics bay 82 with access through the underside; an aft propellant tank 84; and an aft bay 86 with a main rocket engine 88 and attitude control propellant tanks (not shown). Space is provided for solar arrays with access through the rear of the vehicle 16. An interface structure 90 is provided for attaching the REFLY 16 to the Pegasus booster 14. The payload bay 78 is located above the wings 60 to allow controllable flight with or without a payload.

Figure 5:
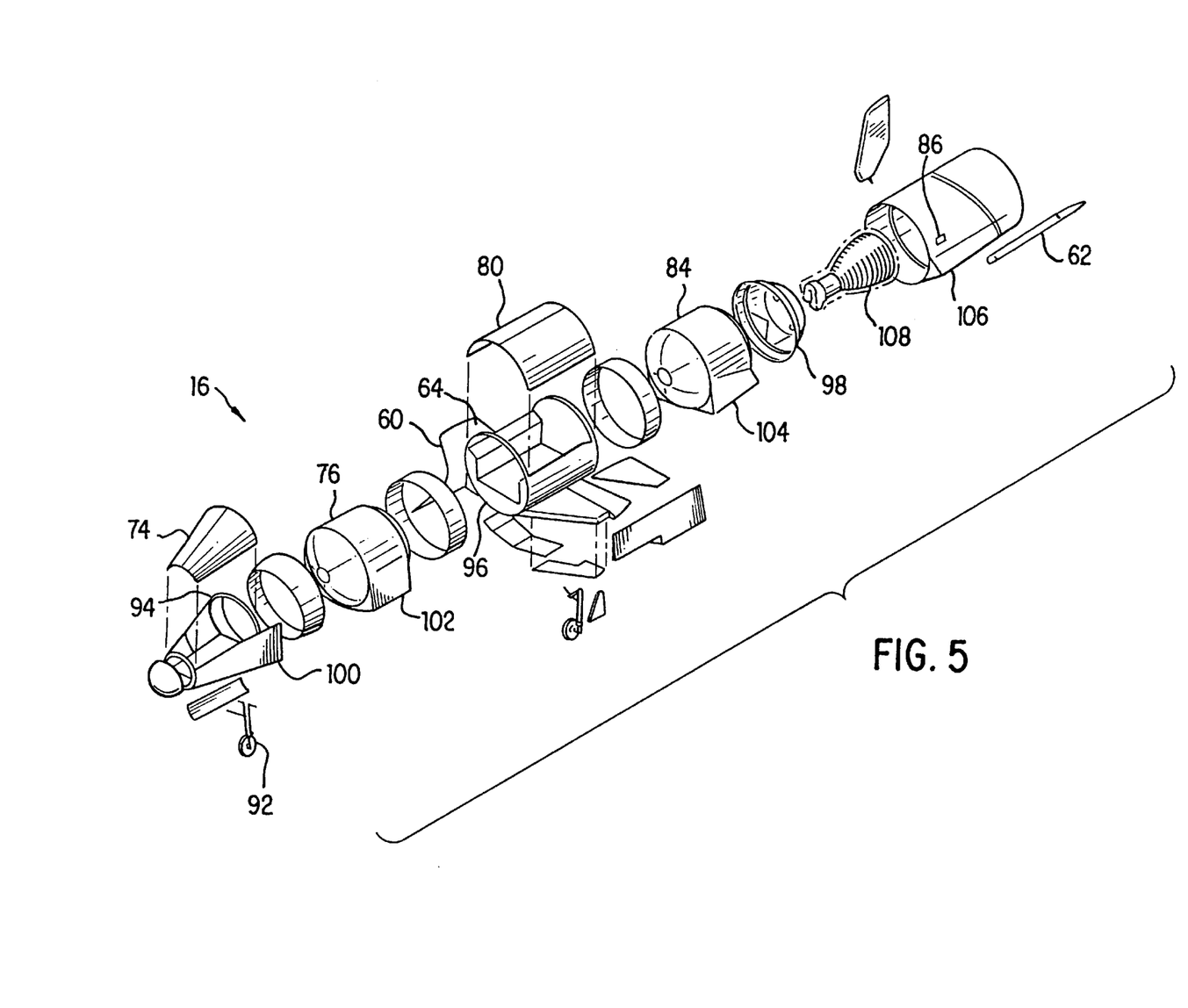
FIG. 5 is an exploded perspective illustration of the reusable flyback vehicle structural components.

Referring now to FIG. 5, an exploded perspective view of the REFLY vehicle 16 is illustrated, designated generally as 16. The majority of the fuselage material is preferably formed of graphite-epoxy material in a honeycomb sandwich construction. The forward landing gear 92 is attached to the fuselage at the forward gear frame 94. The releaseably attached forward access doors 74 and payload bay access doors 80 are of a graphite epoxy honeycomb sandwich construction. The payload bay doors 80 attach to the mid fuselage structure 96 by hinges. A thrust structure 98 and an aft bay 86 are also preferably graphite epoxy construction. The propellant tanks 76, 84 are integral structure preferably comprised of 2219-T87 aluminum in an isogrid stiffened construction. The mid fuselage structure 96 also serves as payload bay structure and wing carry through structure. This design results in an efficient, lightweight construction. The wings 60, flaperons 64, and tails 62 are preferably formed of graphite-bismaleimide (BMI) in a solid panel construction. At 400° F., BMI has a 100° F. higher use temperature than epoxy, which lowers the weight of the thermal protection system (TPS (discussed below) on the wings 60, 64 and tails 62. Graphite epoxy is used in the fuselage because the temperature of the payload and internal components should be maintained below 300° F.

A fuselage fairing on the lower surface of the REFLY vehicle 16 is formed of elements 100, 102, 104, and 106. The fairing runs the length of the fuselage and serves multiple functions including heat shielding of the forward side fuselage during entry, attachment for the wings, and as a housing for the solar array. The fairing is also preferably comprised of graphite-epoxy honeycomb sandwich construction.

The reusable characteristic of the REFLY vehicle 16 is achieved in part by the use of a reusable thermal protection system (TPS). The primary elements of the TPS are an advanced flexible reusable surface insulation (AFRSI) blanket and high thermal performance (HTP) tiles. The AFRSI blanket is used in relatively low temperature areas of the REFLY vehicle 16. The AFRSI blanket is an insulation blanket fabricated from quartz fiber, from Nextel™ fiber or from Nicalon™ fiber that has a quilted fabric on the outer mold line surface as its fabrication process or construction technique. (It has been developed under the U.S. Space Shuttle Program.)

Higher temperature areas, including the nose and leading edges of the aerodynamic surfaces, use HTP tiles with a toughened uni-fibrous insulation (TUFI) coating. HTP tiles are ceramic tiles developed under the U.S. Space Shuttle Program. TUFI is a protective coating also developed under the U.S. Space Shuttle Program comprised of a silicon based material with additives for optimal optical properties. The REFLY vehicle 16 nose radius and wing and tail leading edge radii are designed to allow use of HTP in these locations. This approach eliminates the need for the carbon-carbon refractory composites nose and leading edge structures used on the Space Shuttle (but does not preclude its use on the REFLY invention). Carbon-carbon structures are complex, costly, and they are more susceptible to impact damage than the HTP tiles with the TUFI coating.

The Space Shuttle uses TPS with an aluminum structure. The present invention, on the other hand, couples the use of TPS with a graphite composite structure. This results in a substantial reduction of the number of TPS parts compared to the Space Shuttle. This reduction is due, in part, to the elimination of the strain isolation pad (SIP) between the structure and the TPS. This is made possible by the similarities in coefficient of thermal expansion (CTE) between the graphite composite structure and the TPS. Such a reduction in TPS part count results in a less costly vehicle to manufacture.

As mentioned above, the main engine 108 of the REFLY vehicle 16 is preferably the XLR-132. The XLR-132 is a storable propellant engine with approximately 3,750–5,250 lbs. of thrust. Compared to other available storage propellant alternatives, its relatively high specific impulse (344.7 seconds), low weight (134 lbs.) and small size make it ideally suitable for the REFLY vehicle 16.

Figure 6:
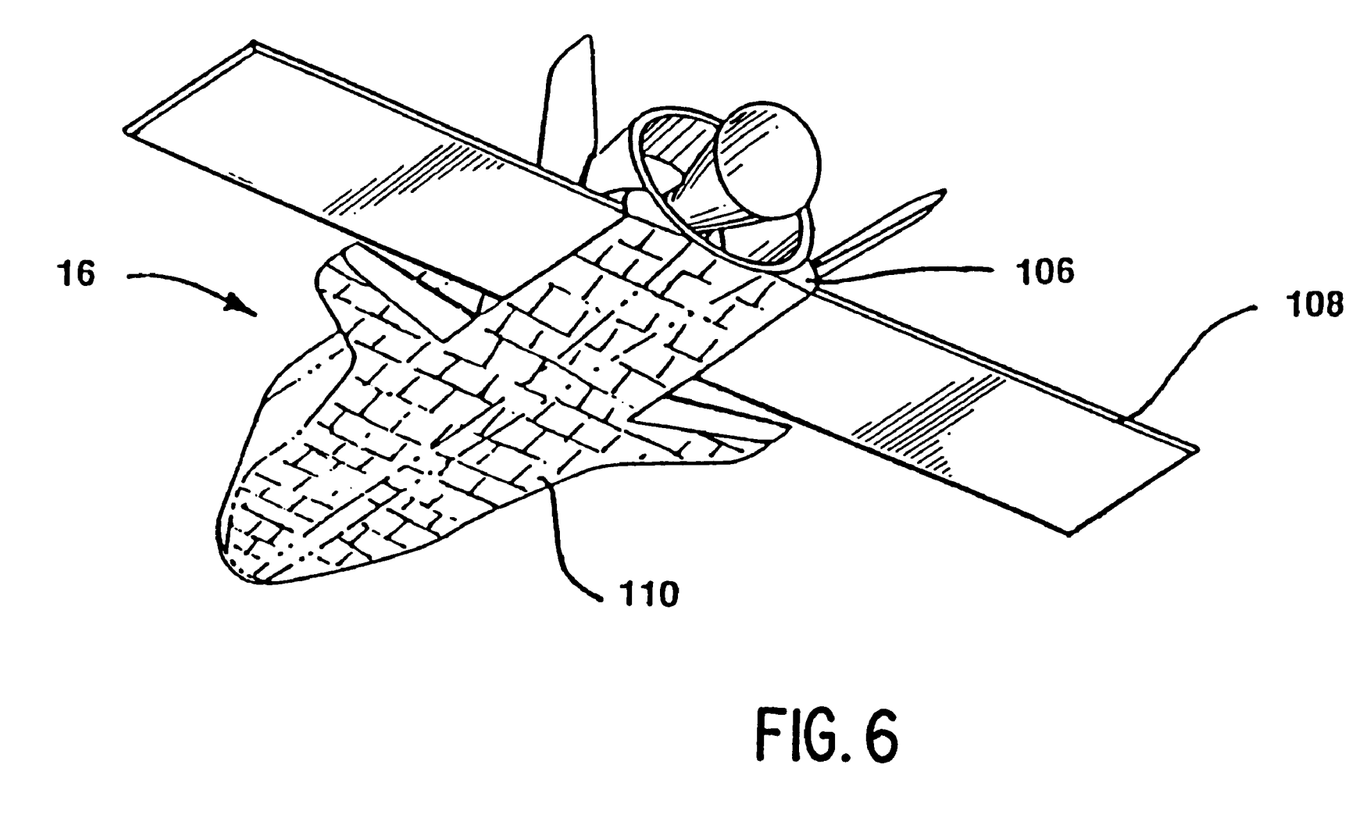
FIG. 6 is a bottom perspective view of the reusable flyback vehicle illustrating extended solar array panels representative of on-orbit operation.

Referring now to FIG. 6, the flexible retractable solar array blanket 108 is seen attached to the REFLY vehicle 16. The solar array 108 can be extended and retracted on-orbit to provide power and to prepare for re-entry, respectively. Its storage location is selected in the aft fuselage fairing 106 to avoid interference with payload operations. The solar array 108 charges recently available nickel-hydrogen secondary batteries, which are used to power the vehicle during ascent, on-orbit eclipse, and during entry.

FIG. 6 also shows the HTP tiles 110 as part of the thermal protection system.

Figure 7:
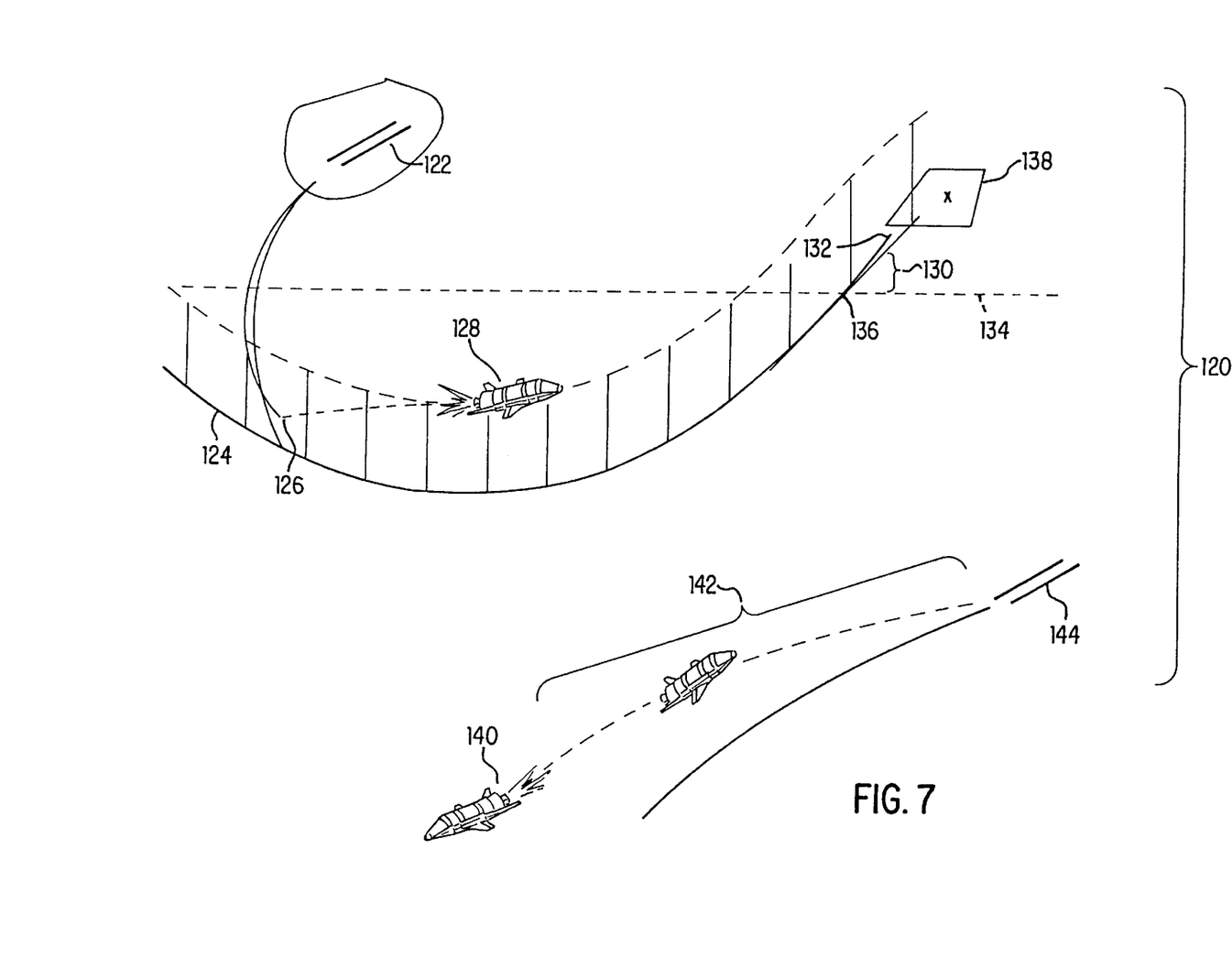
FIG. 7 is a schematic diagram illustrating a preferred operational methodology of the present invention.

Referring now to FIG. 7, a preferred method of operation of the present system is illustrated, designated generally as 120. A carrier aircraft with an attached booster vehicle and reusable flyback satellite takes off from a conventional runway 122. The carrier aircraft positions the booster vehicle and refly satellite in the plane of the desired orbit 124 as determined by inclination 130 and longitude of the ascending node 136. Inclination is defined by the angle formed by the plane of the orbit 132 and the equator 134. The reusable flyback satellite and its boosters are released at point 126. Following burnout and separation of the rocket booster stages, the reusable flyback satellite ignites its integral rocket motor for the final ascent stage. The reusable flyback satellite completes orbit insertion at point 128.

The reusable flyback satellite overflys the geographic area of interest 138 on the initial mission orbit and, depending on the mission, for up to three additional consecutive orbits. The reusable flyback satellite reverses its direction and ignites its integral rocket motor to decelerate for re-entry at point 140. It executes an energy management and crossrange re-entry profile, designated generally as 142, to align with the recovery runway 144.

Obviously, many modifications and variations are possible in view of the above teachings. It is therefore to be understood that within the scope of the appended claims, the invention may be practiced otherwise than as specifically described. For example, although an L-1011 aircraft has been illustrated, it is understood that suitable alternatives may be used instead, such as a B-52 or KC-10. Additionally, although the present invention has been described in relation to the Pegasus booster alternate boosters can be developed which perform a similar function as the Pegasus boosters. It is also noted that different structural materials such as aluminum may be employed along with alternative TPS such as carbon-carbon. It is further understood that although the REFLY vehicle has been described with its use with a rocket booster, it is understood that it may be integrated with a hypersonic, air breathing system or aircraft.

What is claimed and desired to be secured by Letters Patent of the United States is:

1. A method of earth orbit space transportation and return utilizing a reusable flyback satellite, comprising the steps of:
   a) positioning a reusable flyback satellite to a desired release point which provides the capability of said satellite to achieve a desired orbit as defined by inclination and ascending node of the first orbit, wherein said step of positioning said reusable flyback satellite to a desired release point, comprises the steps of:
      (i) cross range positioning said reusable flyback satellite to a desired first position being said ascending node of the first orbit via an airbreathing carrier aircraft, wherein said reusable flyback satellite, having accelerating and positioning means attached thereto, is detached from said carrier aircraft; and,
      (ii) accelerating said reusable flyback satellite to said desired release point via said accelerating and positioning means whereupon said reusable flyback satellite is releasable from said accelerating and positioning means;
   b) deploying said satellite at said release point;
   c) injecting said satellite into orbit and overflying the geographic area of interest on said first orbit and for up to three additional consecutive orbits;
   d) providing on-orbit function and services to a payload of said satellite; and,
   e) de-orbiting, re-entering and landing said satellite with airplane-like functionality and utility.

2. The method of claim 1, wherein said step of landing said satellite comprises landing said satellite on a runway.

3. The method of claim 1, wherein said step of re-entering comprises utilizing an energy management profile and crossrange maneuvering to provide alignment with a conventional runway.

4. The method of claim 1, wherein said step of injecting said satellite into orbit comprises utilizing an integral rocket motor.

\* \* \* \* \*